Nov. 12, 1946.　　　　E. A. WENK　　　　2,410,912

HEAT EXCHANGER

Filed May 2, 1944

INVENTOR.

Edward A. Wenk

BY

Popp and Popp

Attorneys

Patented Nov. 12, 1946

2,410,912

UNITED STATES PATENT OFFICE 2,410,912

HEAT EXCHANGER

Edward A. Wenk, New York, N. Y., assignor to The Keystone Manufacturing Co., Buffalo, N. Y., a corporation of New York Application May 2, 1944, Serial No. 533,706

9 Claims. (Cl. 285—22)

This invention relates to a heat exchanger and more particularly to a heat exchanger made of flared tubing and flared tube fittings.

In refrigeration work it is frequently desirable to employ flared tubing and flared tube fittings because of the relatively high pressures encountered. In such work it is frequently desirable to provide a heat exchanger in which the temperature of a fluid flowing in one part of the system can be raised or lowered by passing it in heat exchange relation with the fluid flowing through another part of the system.

It is therefore the principal object of the present invention to provide a heat exchanger which is built up of flared tubing and fittings in which the joints are strong and are sealed against the high pressure to which flared tubing is usually subjected and which can be made in any length to provide any desired amount of heat transfer surface.

Another object is to provide such a heat exchanger in which the principal parts of the fittings comprise convertible L, T and sight glass fitting forming the subject of my copending application Serial No. 533,705, filed May 2, 1944, and one of the adapters forming part of my copending application Serial No. 532,133, filed April 21, 1944. By the interchangeable use of the principal elements of these devices, the installer need only carry with him a small number of parts to provide and L, a T, a sight glass or a heat exchanger as occasion may require.

Another object is to provide such a heat exchanger in which the parts are low in cost and can be assembled with comparatively little skill.

Figures 1, 2:
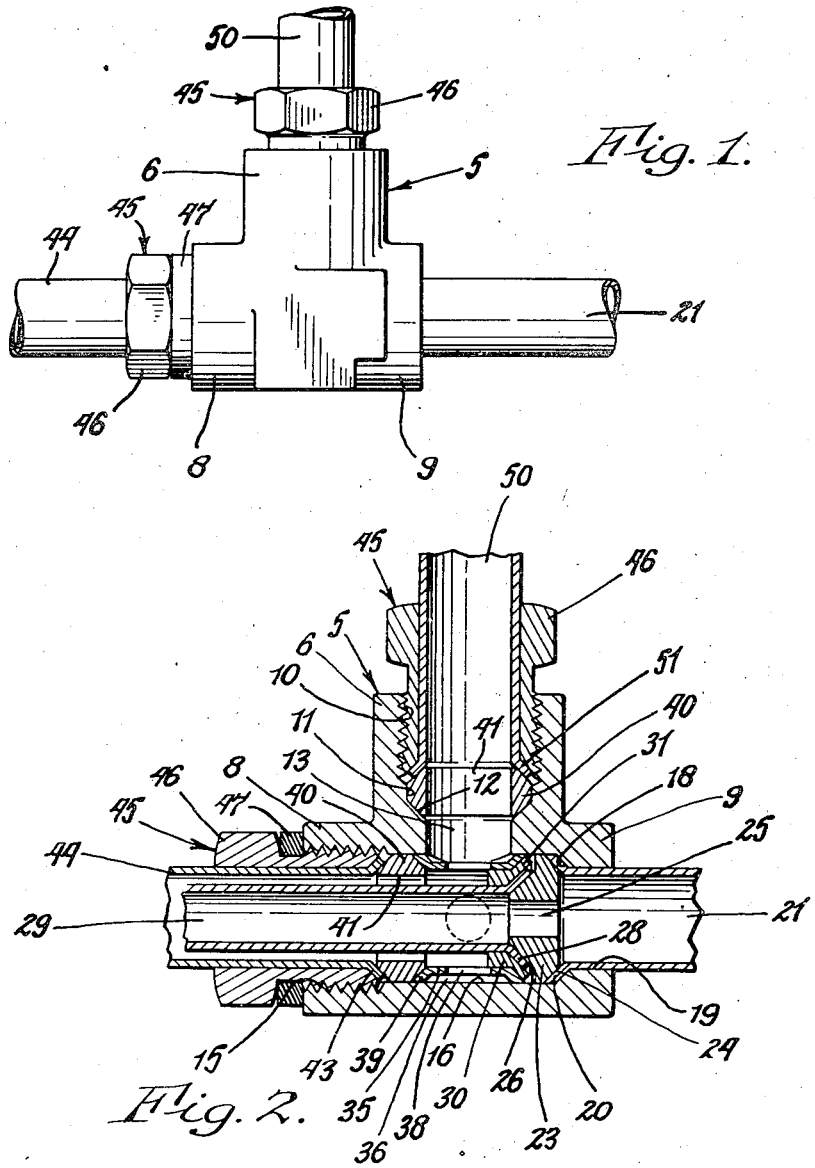
Fig. 1 is a side elevation of one end of a heat exchanger made in accordance with my invention, the other end being identical and hence not being illustrated.
Fig. 2 is a vertical longitudinal section therethrough.

Each end of the heat exchanger is formed by a fitting the body of which is indicated at 5 and which has three legs or branches 6, 8 and 9, the leg 6 being at right angles to the legs 8 and 9 which are axially in line with each other. The leg 9 is substantially shorter than the other two legs to reduce the over-all length of the heat exchanger for a given amount of heat transfer surface and thereby enable the installation of a heat exchanger having the maximum amount of heat transfer surface in cramped quarters.

The leg 6 of the body is provided with a central bore, the enlarged outer end 10 of which is threaded and leads to a cylindrical part 11 which terminates in a conical or beveled seat 12, the inner rim of this seat being defined by a reduced bore 13.

The legs 8 and 9 are provided with a coaxial bore, the enlarged outer end 15 of which is threaded and leads to a cylindrical part 16 which terminates in a conical or beveled seat 18, the inner rim of this seat being defined by a reduced bore 19.

Against the conical or beveled seat 18 is fitted the flare 20 of a tube 21, this flare being provided in the usual and well known manner at the end of the tube to project laterally therefrom in the form of a conical bell. Against the opposite or concave face of this flare 20 is fitted a ring member 23 which has its periphery fitted in the bore 16 of the body and is provided with a conical convex seat 24 fitting the concave end face of the flare 20. This ring member 23 is provided with a through bore 25 and on its side opposite from the seat 24 is provided with a conical convex seat 26 which is of similar form but extends further toward the axis of the ring member than the seat 26 so as to fit the end face of the flare 28 of a tube 29 which is of smaller diameter than the tube 21.

Surrounding the tube 29 is an adapter 30, this adapter having a tubular stem which is fitted around the tube 29 and also having a laterally projecting end flange 31 which is of flaring or bell shaped form to provide a concave conical end face fitting the convex conical face of the flare 28 of the tube 29 and having a convex conical face on its opposite side.

On the stem of this adapter 30 is fitted a tubular member 35, the body of this tubular member 35 being of smaller diameter than the bore 16 of the body so as to provide an annular chamber 36 between the tubular member 35 and the bore 16 of the body. The body of this tubular member 35 is likewise provided with holes 38 extending therethrough, the total cross sectional area of these holes being sufficient to permit the unimpeded flow of liquid through the heat exchanger. The tubular member 35 is provided at its opposite ends with flaring or bell-shaped end flanges 39, the peripheries of which are adapted to fit the bore 16 of the body and the concave end face of one of which is fitted against the convex face of the flange 31 of the adapter 30. The concave end face of the opposite flange 39 of the tubular member 35 seats against one of the convex beveled end faces of a ring or washer 40, the periphery of which is fitted in the bore 16 of the body and the bore 41 of which is preferably equal to the inside diameter of the tube 21.

Against the opposite convex beveled end face of the ring or washer 40 is fitted the concave end face of the flare 43 of a tube 44, this tube 44 preferably being of the same size as the tube 21. This flare is held seated against the ring or washer 40 by an internal flare nut 45 which is of cylindrical form, the tube 44 being fitted in its bore. This flare nut is threaded to screw into the threads 15 of the body and has a concave conical end face which seats against the concave conical face of the flare 43 of the tube 44. A lead washer 47 is interposed between the head 46 of this internal flare nut and the end of the leg 8, this lead washer spreading when the flare nut is screwed in and providing full contact to prevent leakage at this point. It will be seen that tightening this internal flare nut 45 forces to the right, as viewed in Fig. 2, the flare 43 of the tube 44; the ring or washer 40; the tubular member 35; the adapter 30; the flare 28 of the tube 29; the ring member 23; and the flare 20 of the tube 21, thereby to hold the interfitting conical faces of these various parts in firm and leak-tight contact with one another. The internal flare nut 45 is provided with the usual hexagonal or out-of-round head 46 to permit the application of a wrench in tightening it down.

Another tube 50 having a flare 51 is secured in the leg 6 of the body. This tube 50 is preferably of the same size as the tubes 21 and 44 and its flare is fitted against the conical end face of a ring or washer 40 which is identical to the ring or washer previously described and is fitted in the bore 11 of the body with its other conical end face seated against the conical seat 12 at the bottom of this bore 11. The flare 51 of the tube 50 is held firmly against this ring or washer 40 by an internal flare nut 45 which is identical to the internal flare nut previously described and is screwed into the threads 10 of the body.

In the operation of the heat exchanger the opposite ends of the tubes 29 and 44 are each connected with the body 5 of a fitting as shown and each of these bodies is connected with the tubes 21 and 50. One stream of fluid can therefore flow axially in through the tube 21 and through the bore 25 of the ring member 23 into the tube 29, this stream similarly flowing out through the bore 25 and tube 21 at the opposite end of the heat exchanger. The other stream of fluid enters the tube 50 at one end of the heat exchanger and passes through the bore 13 of the body 5 into the annular chamber 36 around the tubular member 35. From this annular chamber the fluid flows through the holes 38 of the tubular member and axially through this tubular member and along the outside of the tube 29. In its continued flow the fluid flows through the bore 41 of the ring or washer 40 into the adjacent end of the tube 44 and out through the fitting 5 and tube 50 at the opposite end of the heat exchanger. The tube 29 thereby provides a heat exchange surface, the one fluid flowing axially through this tube in one direction and the other fluid flowing axially in the space between this tube 29 and the tube 44 in the same or the opposite direction depending upon whether concurrent or countercurrent flow is desired. By selecting the length of the tubes 29 and 44 any desired amount of heat transfer surface can be provided.

From the foregoing it will be seen that with the fittings embodying the present invention a heat exchanger having any desired amount of heat transfer surface can be made of lengths of flare tubing. Further the parts of the heat exchanger have other uses, as set forth in my said copending applications and can readily be assembled by one having little skill.

I claim as my invention:

1. A heat exchanger, comprising a pair of tubes of different diameters fitted coaxially one within the other and each having its opposite ends flared, a T fitting at the opposite ends of said pair of tubes and each having one leg provided with a bore receiving the corresponding ends of said tubes, means providing a sealed joint between the larger of said tubes and the surrounding bore of said one leg of each of said fittings, means within said bore of each of said fittings and establishing communication between the interior of said larger tube and a second of said legs, said bore extending through the third of said legs, and means within said bore of each of said fittings and establishing sealed communication between the interior of the smaller of said tubes and said third of said legs.

2. A heat exchanger, comprising a pair of tubes of different diameters fitted coaxially one within the other and each having its opposite ends flared, the smaller of said tubes being longer than the larger of said tubes and having its ends projecting outwardly therefrom, a T fitting having a pair of coaxial legs with a bore extending coaxially therethrough and a third leg arranged at an angle to the other legs and having a bore communicating with said coaxial bore, the bore through one of said coaxial legs of each fitting receiving the corresponding ends of both of said tubes with the end of the smaller of said tubes being arranged in said bore adjacent the other coaxial leg thereof, means providing a sealed joint between the larger of said tubes and the surrounding bore of said one of said coaxial legs, means providing a sealed joint between the smaller of said tubes and the surrounding bore of said other coaxial leg, and means within said bore of each of said fittings and establishing communication between the interior of said larger tube and said third leg.

3. A heat exchanger, comprising a pair of tubes of different diameters fitted coaxially one within the other and each having its opposite ends flared, the smaller of said tubes being longer than the larger of said tubes and having its ends projecting outwardly therefrom, a T fitting having a pair of coaxial legs with a bore extending coaxially therethrough and a third leg having a bore communicating with said coaxial bore, the end of said coaxial bore within one of said coaxial legs being reduced and forming a shoulder opposing the enlarged end thereof, and the corresponding ends of both of said tubes being fitted in the enlarged end of the coaxial bore of each fitting, means providing an annular seat between each flared end of the smaller of said tubes and the corresponding shoulder, means within the larger end of the coaxial bore of each fitting and providing a seat for the corresponding flared end of the larger of said tubes and providing communication between said larger of said tubes and said third leg of each fitting, and means in the enlarged end of the coaxial bore of each fitting and holding the flared ends of both of said tubes in sealed engagement with said seats.

4. A heat exchanger, comprising a pair of tubes of different diameters fitted coaxially one within the other and each having its opposite ends flared, the smaller of said tubes being longer than the larger of said tubes and having its ends projecting outwardly therefrom, a T fitting having a pair of coaxial legs with a bore extending coaxially therethrough, and a third leg having a bore communicating with said coaxial bore, the end of said coaxial bore within one of said coaxial legs being threaded and the end of said coaxial bore within the other of said coaxial legs being reduced and forming a shoulder opposing the threaded end thereof and the corresponding ends of both of said tubes being fitted in the threaded end of the coaxial bore of each fitting, means providing an annular seat between each flared end of the smaller of said tubes and the corresponding shoulder, means within the threaded end of said coaxial bore of each fitting and providing a seat for the corresponding end of the larger of said tubes and providing communication between said larger of said tubes and said third leg of each fitting, and an internal flare nut in the threaded end of the coaxial bore of each fitting and holding the flared ends of both of said tubes in sealed engagement with said seats.

5. A heat exchanger, comprising a pair of tubes of different diameters fitted coaxially one within the other and each having its opposite ends flared, the smaller of said tubes being longer than the larger of said tubes and having its ends projecting outwardly therefrom, a T fitting having a pair of coaxial legs with a bore extending coaxially therethrough and a third leg having a bore communicating with said coaxial bore, the end of said coaxial bore within one of said coaxial legs being threaded and the opposite end of said coaxial bore being of reduced diameter and forming a shoulder opposing the threaded end thereof, and the corresponding ends of both of said tubes being fitted in said threaded end of said coaxial bore, means providing an annular seat between each flared end of the smaller of said tubes and the corresponding shoulder, means within said threaded end of said bore of each fitting and providing a seat for the corresponding end of the larger of said tubes, a tubular member in each coaxial bore and interposed between the flares of the tubes therein and having an opening providing communication between said larger of said tubes and the third leg of each fitting, and an internal flare nut screwed in the threaded end of the coaxial bore of each fitting and holding the flared ends of both of said tubes in sealed engagement with said seats and against said tubular members.

6. A heat exchanger, comprising a pair of flared ended tubes of different diameters fitted coaxially one wtihin the other, the smaller of said tubes being longer than the larger of said tubes, a T fitting having a pair of coaxial legs with a bore extending coaxially therethrough and a third leg having a bore communicating with said coaxial bore, the end of said coaxial bore within one of said coaxial legs being threaded and the opposite end of said coaxial bore being of reduced diameter and forming a shoulder opposing the threaded end thereof, and the corresponding ends of both of said tubes being fitted in said threaded end of said coaxial bore, means providing an annular seat between each flared end of the smaller of said tubes and the corresponding shoulder, means within said threaded end of said bore of each fitting and providing a seat for the corresponding end of the larger of said tubes, a tubular member having laterally outward projecting end flanges fitted in the coaxial bore of each fitting and interposed between the flares of the tubes therein, said tubular member being provided with an opening providing communication between said larger of said tubes and the third leg of each fitting, and an internal flare nut screwed in the threaded end of the coaxial bore of each fitting and holding the flared ends of both of said tubes in sealed engagement with said seats and against said tubular members.

7. A heat exchanger, comprising a pair of flared ended tubes of different diameters fitted coaxially one within the other, the smaller of said tubes being longer than the larger of said tubes, a T fitting having a pair of coaxial legs with a bore extending coaxially therethrough and a third leg having a bore communicating with the central part of said coaxial bore, one end of said coaxial bore being of reduced diameter and providing an annular seat opposing the enlarged end of said bore, said enlarged end of said bore being threaded, a third tube secured in said bore of reduced diameter and having a flared end engaging said seat, the corresponding ends of both of said tubes being fitted in the enlarged end of said bore, a ring member in the enlarged part of the coaxial bore of each fitting and having annular seats on its opposite sides and engaging respectively the flares of said third tube and the smaller of said tubes, a tubular member in the enlarged part of each coaxial bore and interposed between the flares of said tubes of different diameters and having an opening providing communication between the larger of said tubes and the third leg of each fitting, and an internal flare nut screwed in the threaded end of the coaxial bore of each fitting and holding said parts within each coaxial bore in operative relation to one another.

8. A heat exchanger, comprising a pair of flared ended tubes of different diameters fitted coaxially one within the other, the smaller of said tubes being longer than the larger of said tubes, a T fitting having a pair of coaxial legs with a bore extending coaxially therethrough and a third leg having a bore communicating with the central part of said coaxial bore, one end of said coaxial bore being of reduced diameter and providing an annular seat opposing the enlarged end of said bore, said enlarged end of said bore being threaded, a third tube in said bore of reduced diameter and having a flared end engaging said seat, the corresponding ends of both of said tubes being fitted in the enlarged end of said bore, a ring member in the enlarged part of the coaxial bore of each fitting and having annular seats on its opposite sides and engaging respectively the flares of said third tube and the smaller of said tubes, a tubular member having laterally outward projecting end flanges fitted in the enlarged part of the coaxial bore of each fitting and interposed between said flares of said tubes of different diameters therein, said tubular member being provided with an opening providing communication between said larger of said tubes and the third leg of each fitting, and an internal flare nut screwed in the threaded end of the coaxial bore of each fitting and holding the said parts within each coaxial bore in operative relation to one another.

9. A heat exchanger, comprising a pair of flared ended tubes of different diameters fitted coaxially one within the other, the smaller of said tubes being longer than the larger of said tubes, a T fitting having a pair of coaxial legs with a bore extending coaxially therethrough and a third leg having a bore communicating with the central part of said coaxial bore, one end of said coaxial bore being of reduced diameter and providing an annular seat opposing the enlarged end of said bore, said enlarged end of said bore being threaded, a third tube in said bore of reduced diameter and having a flared end engaging said seat, the corresponding ends of both of said tubes being fitted in the enlarged end of said bore, a ring member in the enlarged part of the coaxial bore of each fitting and having annular seats on its opposite sides and engaging respectively the flares of said third tube and the smaller of said tubes, a tubular member having laterally outward projecting end flanges fitted in the coaxial bore of each fitting and interposed between the flares of said tubes of different diameters therein, said tubular member being provided with an opening providing communication between the larger of said tubes and the third leg of each fitting, an adapter having a tubular stem fitted in each of said tubular members and around the corresponding end of the smaller of said tubes and having a laterally outwardly projecting end flange interposed between the adjacent flare of the smaller of said tubes and the adjacent end flange of said tubular member, and an internal flare nut screwed in the threaded end of the coaxial bore of each fitting and holding the said parts within each coaxial bore in operative relation to one another.

EDWARD A. WENK.